United States Patent [19]

Wiart et al.

[11] Patent Number: 4,509,337

[45] Date of Patent: Apr. 9, 1985

[54] SOLAR ENERGY REFRIGERATION DEVICE

[75] Inventors: Albert Wiart, Sannois; Gérard Paeye, Champagne sur Seine, both of France

[73] Assignee: Jeumont-Schneider Corporation, France

[21] Appl. No.: 567,268

[22] Filed: Dec. 30, 1983

[30] Foreign Application Priority Data

Jan. 3, 1983 [FR] France ............... 83 00001

[51] Int. Cl.³ ............................... F25B 15/00
[52] U.S. Cl. ..................... 62/235.1; 62/476; 62/480
[58] Field of Search ............ 62/235.1, 476, 238.3, 62/477, 478, 479, 480, 481

[56] References Cited

U.S. PATENT DOCUMENTS 4,034,569  7/1977  Tchernev ............... 62/235.1
4,178,989  12/1979  Takeshita et al. ........ 62/235.1

Primary Examiner—Henry Bennett

Attorney, Agent, or Firm—Rines and Rines, Shapiro and Shapiro

[57] ABSTRACT

The invention relates to a refrigeration device using solar energy. This device includes a refrigeration fluid, such as water, which circulates between the solar energy heat exchanger 8 containing zeolite, and an evaporator 2 located in a cooling chamber 1 through a condenser 6, then return to the exchanger 8 through a three way valve 7. The device includes a second channel in the exchanger 8, which channel includes a fluid, and a second exchanger consisting of a tube with fins 20 connected to a storage tank 25 containing water at various temperatures. During the day whenever the period of sunshine is not sufficient, additional heat in the form of hot water is provided to the exchanger 8.

Conversely if the night temperature is not low enough, cooling in the exchanger 8 is assisted by a cooling device 23 located in the second channel. Hot water 25° C. is provided by the excess heat produced by the sun at day's end.

7 Claims, 1 Drawing Figure

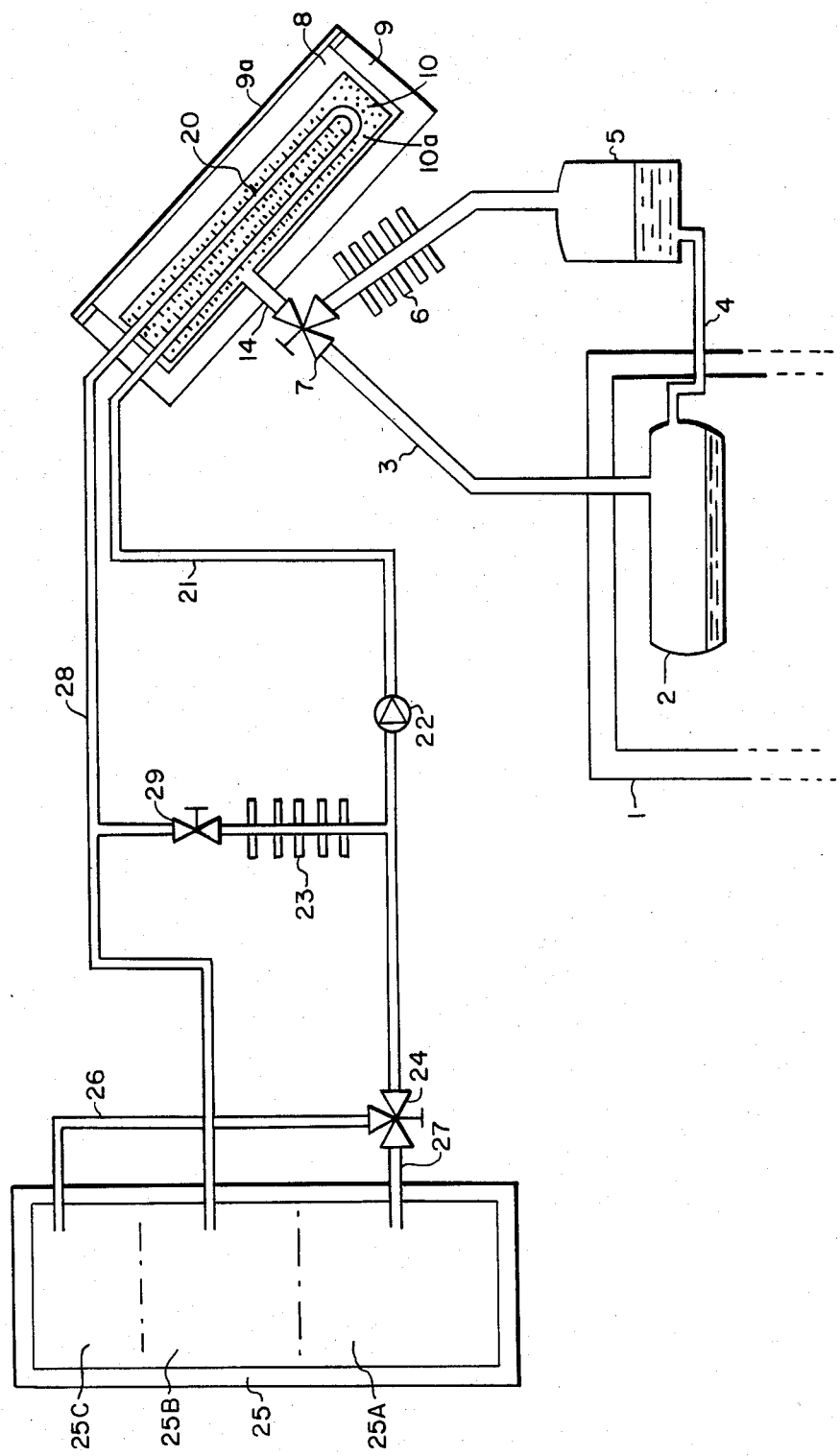

SOLAR ENERGY REFRIGERATION DEVICE

This invention relates to a refrigeration device which operates through the intermittent input of thermal energy, in particular a system including a collector of solar energy connected to a cold chamber to be refrigerated.

We know several refrigeration devices which produce or keep ice during the night through the use of thermal energy collected by the solar collector during the day. Such a device is described in French Pat. No. 2 391 434. The operation of these devices constists of two phases:

a diurnal phase during which a refrigeration fluid circulates from the solar collector toward the cold chamber through a first channel, and a night phase during which the refrigeration fluid circulates from the cold chamber towards the solar collector through a second channel.

In order to link the interior of the collector with one or the other of the two channels, a three way valve is used, which valve permits the change in direction of fluid circulation and is set at the begining of each phase.

However, the device as foreseen above has several disadvantages: firstly, if the period of sunshine is not sufficient because of a cloudy sky, the aforementioned cycle is not completed in an optimum manner and its yield decreases to the detriment of the quality of the cold in the cold chamber. Moreover, if the night temperature is not sufficiently low, the yield of the cycle is further reduced. Finally if all the fluid has circulated from the collector to the evaporator of the cold chamber before the end of the period of sunshine, the thermal energy provided later by the collector is lost because it is not really utilized.

The object of the invention is to temper these disadvantages and to propose a device which would permit on one hand to complete the exposure to the sun by inputting heat in the event the period of sunshine is insufficient, on the other hand to complete the night cooling phase in the event the night temperature is not sufficiently low, and finally to recover the heat that could be lost, which heat is provided by the sun shining at day's end.

In summary, the invention relates to a refrigeration device which operates by input of thermal energy and of the type which has a first channel connected to a solar collector, at the interior of which is placed a substance with a high adsorption and desorption capability, and which channel is connected to an evaporator located in a cooling case and includes a duct connected either to the input of the evaporator through a condenser, or to an output of the evaporator. A refrigeration fluid circulates in a second channel which, at the interior of the substance, is equipped with an exchanger connected to a supply tank containing a second fluid at various temperatures in order to transfer heat between said substance and said second fluid.

Thus, according to the invention, an appropriate flow of hot fluid inside the substance can be used to complete or supplement an inadequate period of sunshine. The aforementioned hot fluid can be obtained through the excess thermal energy provided by the solar collector between the end of the desorption phase and the beginning of the adsorption phase whenever an adequate period of sunshine occurs prior to the period of inadequate sunshine. In additon, according to the invention, additional cooling can be provided by circulation of a cool fluid in the exchanger in the event the night temperature is not low enough to permit an efficient adsorption. In that event it is advantageous that the second channel be close looped through an appropriate cooling device.

Preferably, water is the fluid circulating in the second channel. In addition, it is advantageous that the second channel includes a circulator at the input of the aforementioned exchanger.

The second channel can include in the input of the circulator a three way valve. Two paths into the three way valve are connected to the cold and hot parts of the aforementioned storage tank respectively. The output of the exchanger is directly connected to the lukewarm part of the tank. Preferably the exchanger includes a tube with fins which goes through the substance located in the solar collector.

The invention will be better understood by reading the following description which is a recommended implementation of the device according to the invention. This description refers to the diagram which is annexed, which diagram shows schematically the device according to the invention. It is first of all necessary to describe and explain the operation of the cooling device to which the invention applies.

In the figure, the device includes an isothermal casing 1 and a solar collector 8 to which it is connected. The isothermal casing 1 which is a cold chamber in which is stored for example food products which are maintained at a temperature approximating 0° C. by the cold produced by the solar collector 8 which, together with the other components of the device, produces ice in the evaporator 2 which is enclosed in the isothermal casing. The solar collector 8 is in the form of a housing 10a preferably made of copper. The interior of the housing is lined with an adsorbing substance 10 such as zeolite which is a microporous aluminosilicate compound with high adsorption or desorption properties. The aforementioned casing 10a containing the zerolite 10 is located in an insulated housing 9 whose upper wall 9a is transparent.

The solar collector 8 communicates with a channel containing water. This channel includes a duct 14 connected to a three way valve 7, a first branch 3 connecting an evaporator 2 inside case 1 to valve 7, and a second branch connecting valve 7 to the upper part of a condenser equipped with fins 6, the lower part of the condenser 6 being connected to the upper part of an external tank 5, the lower part of the tank being connected to the upper part of the evaporator 2. The water is in a channel which is closed to the atmosphere and in which pressures vary between 10 and 100 millibars.

The operating principle is as follows: during the day, the sun rays heat the solar collector 8 and the zeolite 10 which is contained therein. The temperature and pressure increase gradually in the solar collector 8. The three way valve 7 obstructs the branch 3 and opens the branch to condenser 6. By desorption, the zeolite throws off its water in the form of vapors which reach the condenser 6. The tube 4 between the exterior tank 5 and the evaporator 2 is of the capillary type and causes the pressure in the evaporator 2 to be substantially less than that in the solar collector 8. As a result of this difference in pressure, the condensed vapors reach the evaporator 2. At night, the temperature and pressure in the solar collector 8 decrease and the evaporator 2 is partially filed with water condensed during the day.

The zeolite 10 has performed the function of a chemical compressor.

At the beginning of the night, the temperature of the zeolite continues to decrease as does the pressure in the condenser 6. The temperature in the storage tank 5 and the solar collector 8 also decreases. The three way valve 7 is then manipulated in order to open branch 3 and to close the connection with the condenser 6. The zeolite performs its function of chemical pump and adsorbs water evaporating from the evaporator 2, thus changing the pressure in the evaporator. The channel being closed to the atmosphere, the water remaining in the evaporator 2 freezes and contributes to maintaining the temperature in the isothermal case around 0° C. This cold producing adsorption phase lasts until the morning.

We could also, by known methods, replace the three way valve 7 by an automatic valve equipped with a siphon such as described in the request for French Pat. No. 82 12824.

The device also includes a second channel which includes of a heat exchanger 20. This heat exchanger comprises of a tube with fins which goes through the entire length of the zeolite 10. The input of the fluid in the exchanger 20 is connected by a duct 21 to the output of a circulator 22. The input of the circulator 22 is connected on one hand to the output of a cooler 23 and on the other hand to the output duct of a second three way valve 24 whose input is connected either to the hot part of a fluid supply tank 25 through a duct 26 or to the cold part of the tank which is in the lower part thereof through a duct 27. The output of the exchanger 20 is connected by a duct 28 on one hand to the lukewarm center part of the tank 25, and simultaneously to the input of the cooler 23 through a valve 29. Water is the fluid circulating in the second channel.

The operation of the second channel is as follows: firstly, assume that during the diurnal phase, that is the desorption, the period of sunshine is more than sufficient and all the fluid of the refrigeration channel has circulated from the collector 8 towards the evaporator 2 through the condenser 6 and the tank 5 before the end of the period of sunshine. We thus see that in the standard refrigeration channel there exists thermal energy which is unusable. In accordance with the invention this energy is utilized to heat the water that circulates in the second channel. This is done by appropriately setting the valve 24, so that water in the cold portion of the tank 25A flows through the duct 27 and the circulator 22 to the exchanger 20, then from the exchanger to the lukewarm portion of the tank 25B through the duct 28.

Hot water is thus continuously available in the upper part of the tank 25C, the walls of the tank being adequately insulated. Whenever the period of sunshine is insufficient, the solar energy is supplemented by changing the position of the three way valve 24 towards the duct 26 connected to the hot part of the tank 25C, with thermal energy being input by the circulation of the hot water in the exchanger 20, with its return through the lukewarm portion 25B.

Finally when the night temperature is not sufficiently low to complete the adsorption phase, then the second channel is used as a cooling channel, that is the water circulates towards the exchanger 20 through the circulator 22, then returns towards the input of the circulator via the duct 28, the valve 29 which is open, and the cooling device 23.

Thus the device according to the invention allows on one hand the operation of the device with adequate temperatures in the collector with an overall higher yield, and on the other hand permits the recovery of the heat provided by the system between the end of the desorption and the beginning of the adorption periods.

We can also foresee methods of reheating the water in the second channel, such as for example an electric resistance or heating through gas, in the event the hottest water in the reservoir is not itself hot enough.

In addition, the manipulation of the valve 24 in the second channel can be accomplished by a thermostat activated by the temperatures recorded in the collector and in the tank 25. The three way valve 24 can in this case be a mixing valve, in order to avoid the possibility that the temperature of the water channeled to the exchanger is too hot.

The invention can be applied successfully to all kinds of refrigeration devices operating by input of thermal energy. In particular the body located in the collector 8 could be coal, the refrigeration fluid being as is customary, methanol. We can also, in the case where the aforementioned substance is zeolite, use salted water as refrigeration fluid.

Finally all modifications that the scientist can implement within the limits of his knowledge could be included in the invention, the application of which is described above, which application is set forth for the purpose of description only.

We claim:

1. A refrigeration device comprising a solar collector containing a substance having a high adsorption and desorption capability, a condenser, an evaporator, a first channel including said condenser and said evaporator and having means for connecting said solar collector through said condenser to an input of said evaporator and, alternatively, for connecting said solar collector to an output of said evaporator, said first channel having a refrigeration fluid therein, and a separate second channel including a heat exchanger disposed in said substance, said second channel having means including a second fluid adapted to circulate through said heat exchanger for transferring heat between said substance and said second fluid.

2. A device in accordance with claim 1, wherein said means for transferring heat includes a storage tank for said second fluid and having different temperature zones, said second channel having an input to said heat exchanger connected to one of said temperature zones and having an output from said heat exchanger connected to another of said temperature zones.

3. A device in accordance with claim 1, wherein said means for transferring heat includes a cooling device and means for connecting said cooling device in a closed loop including said heat exchanger.

4. A device in accordance with claim 1, wherein said means for transferring heat includes a storage tank for said second fluid and having hot, cold, and lukewarm temperature zones, means for selectively connecting either said hot zone or said cold zone to an input of said heat exchanger, and means for connecting an output of said heat exchanger to said lukewarm zone.

5. A device in accordance with claim 4, wherein said means for transferring heat includes a cooling device and means for connecting said cooling device in a closed loop including said heat exchanger.

6. A device in accordance with claim 1, wherein the second channel includes a circulator connected to an input of the heat exchanger.

7. A device in accordance with claim 1, wherein the evaporator is disposed in a cold chamber and the condenser is connected to the input of the evaporator via a pressure reducer.

* * * * *